United States Patent [19]
Kanngiesser

[11] 3,801,895
[45] Apr. 2, 1974

[54] METHOD FOR CONTROLLING HVDC TRANSMISSION SYSTEM TO AVOID LINE FREQUENCY OVERVOLTAGE UPON LOAD DUMPING

[75] Inventor: Karl-Werner Kanngiesser, Viernheim, Germany

[73] Assignee: Aktiengesellschaft Brown, Boveri & Cie, Baden, Switzerland

[22] Filed: Feb. 9, 1971

[21] Appl. No.: 113,828

Related U.S. Application Data
[63] Continuation-in-part of Ser. No. 62,401, Aug. 10, 1970, abandoned.

[30] Foreign Application Priority Data
Aug. 28, 1969 Germany.............................. 1943646

[52] U.S. Cl................................................ 321/27 R
[51] Int. Cl. ........................................... H02m 7/00
[58] Field of Search ..................... 321/2, 5, 11, 27

[56] References Cited
UNITED STATES PATENTS
3,391,325  7/1968  Giannamore ......................... 321/11
3,423,664  1/1969  Dewey ................................. 321/11
3,466,525  9/1969  Ainsworth............................. 321/5
3,474,321  10/1969  Ainsworth............................. 321/5

Primary Examiner—William M. Shoop, Jr.
Attorney, Agent, or Firm—Pierce, Scheffler & Parker

[57] ABSTRACT

In a high-voltage d-c transmission system in which power fed in from a three-phase a-c network is rectified by thyristor valves into d-c at one station and transmitted as d-c to a receiving station where it is inverted to a-c power by thyristor valves, line-frequency overvoltage stresses on the valves are avoided, in the case of a disturbance of the type in which partial or complete dumping of the load occurs, by progressively controlling back the d-c to a value greater than zero thus to continue absorption of reactive power from the a-c feeding network. The progressive control-back involves a progressive change-over from rectifier to inverter operation by effecting a progressive change in the ignition angle for the valves.

2 Claims, 6 Drawing Figures

Inventor
Karl-Werner Kanngiesser
By Pierre, Schiffler & Parker
Attorneys

METHOD FOR CONTROLLING HVDC TRANSMISSION SYSTEM TO AVOID LINE FREQUENCY OVERVOLTAGE UPON LOAD DUMPING

This is a continuation-in-part of application Ser. No. 62,401, filed Aug. 10, 1970 now abandoned.

This invention relates to an improved method of and apparatus for diminishing the line-frequency overvoltage stress of current rectifier valves, in particular upon load dumping of a high-voltage d-c transmission (HVDC) system.

Figure 1:
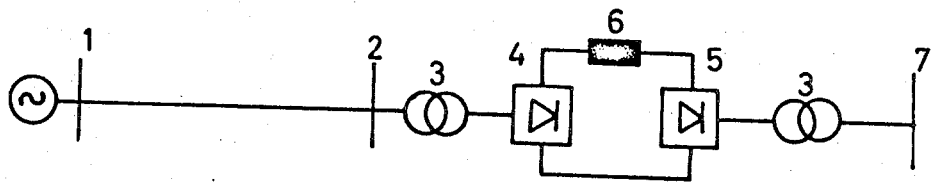

The basic circuitry of a HVDC system is well known and is discussed, for example, in the German Publication "ETZ/A", Vol. 89 (1968), No. 8/9, p. 4, (figure 1). In such a system there occur: atmospheric overvoltages, internal overvoltages as a result of the commutation process, and quasi-stationary voltage elevations due to a fault on the transmission line or in the station and the resulting load or partial-load dumping (page 38 of the above-mentioned literature reference).

When disturbances occur, the converter valves of a HVDC system are exposed in the d-c as well as the a-c network to increased voltage and current loads. In particular with weak feeding three-phase a-c networks, i.e. with low short-circuit power $S''_k$, one must expect, in the case of a sudden load dumping of the entire HVDC system, high line-frequency overvoltage stresses of the windings of the converter transformers and hence also of the converter valves, which cannot be limited by overload arresters. Especially when using semiconductor converters, it impairs the efficiency to rate the thyristor valves for these overvoltages. The goal will be to save the expenditure for the overdimensioning of the valves by suitable measures. For instance, the reactive power delivery of the compensation devices may be so rated that as low as possible an overvoltage occurs upon load dumping of the HVDC.

In the systems constructed until now the attempt was made to increase the short-circuit power of the network by additional rotating phase shifters (page 32, paragraph 2, of the above cited literature reference).

Another method, though applicable only with limitations, is the reduction of the commutation reactance by lowering the short-circuit voltage of the converter transformers; thereby the reactive power requirement of the HVDC station is diminished and hence the reactive power released upon load dumping is reduced; however, at the same time the excess current stress of the valves in cases of disturbance increases (page 32, paragraph 1 of the above-cited literature reference).

Figure 5:
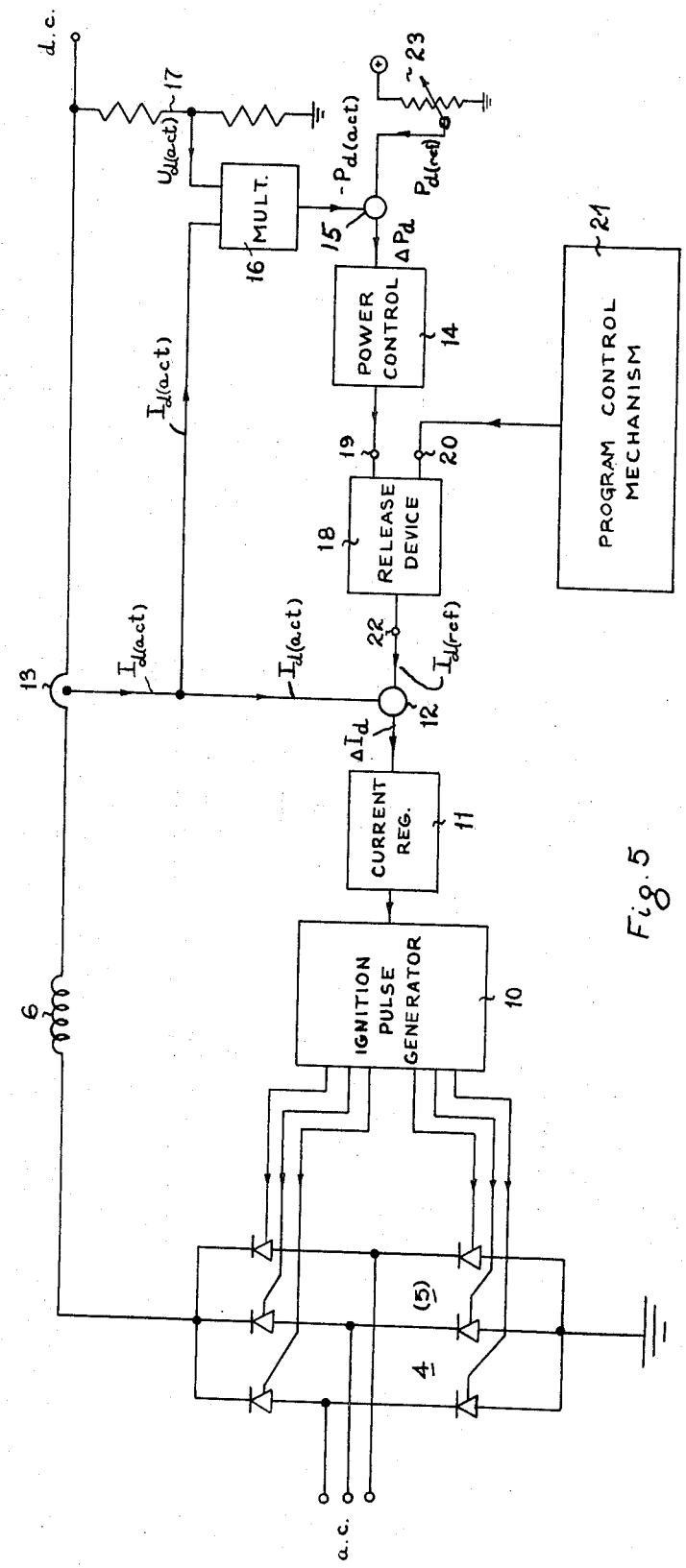

To facilitate an understanding of the following, we shall first describe a so-called HVDC short coupling with reference to FIG. 1 (p. 7, figure 5, of the above cited literature reference).

A three-phase a-c line 1, 2 of a length of 500 km, for example, feeds over a converter transformer 3 the rectifier side 4 of the HVDC short coupling. Rectifier 4 is connected with an inverter 5 with insertion of smoothing chokes 6. The consumer network 7 is coupled to the inverter 5 over an additional converter transformer 3. The line-frequency voltage increases due to a load dumping is determined by the data of the three-phase a-c line if one assumes that the d-c controlled to zero and thus the rectifier goes out of operation. The reactive power input of a converter, in fact, is approximately proportional, at constant d-c, to the sine of the control angle α, but at zero regulation of the current, the reactive power also goes back to zero. Therefore, there will occur an increased voltage stress of the thyristor valves of the converter according to the overvoltage behavior of the wattless three-phase a-c line, making it necessary, of course, to take into consideration also connected filter circuits or respectively, condenser batteries.

Figure 2:
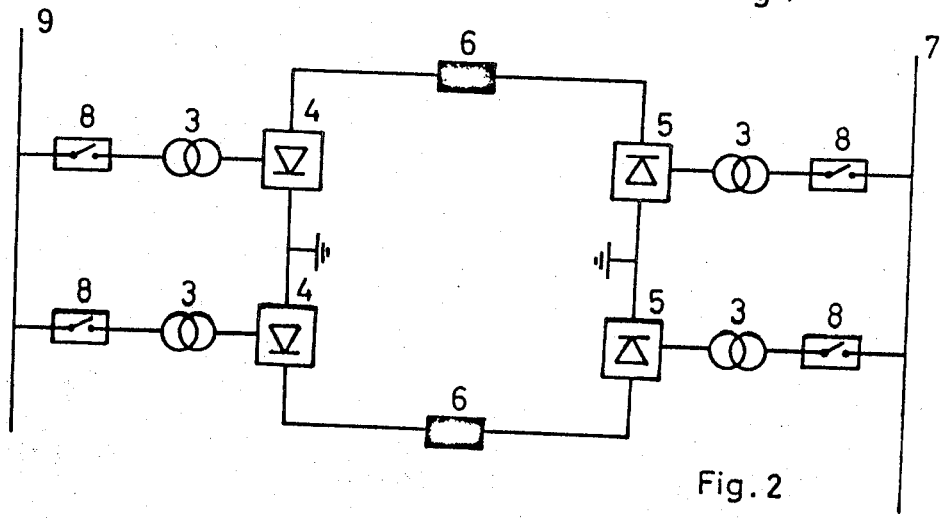

In normal operation, let a stable load flow over the HVDC be assumed. Let each station, i.e. rectifier and inverter consist of two halves, i.e. converter bridges 4,4 and 5,5 each station half including a transformer 3 and a power switch 8. Let each station half be grounded between the bridges, so that a ground-symmetrical operation results (FIG. 2).

In the following cases of failure a (50 percent or 100 percent load dumping of the HVDC occurs.

1. The release of both power switches 8 on the rectifier side, i.e. on a bus bar 9.

The converter valves are not affected by the voltage increases; hence this case is not critical. The valves carrying current at that moment can no longer commutate and carry the current until the energy stored in the d-c circuit is reduced, which normally takes only a few milliseconds. The inverter then goes out of operation. If only one power switch fails, 50 percent load dumping occurs, which causes overvoltages on the rectifier bridge remaining in operation, but these come to only about 50 percent of the value at full load dumping.

2. Release of both power switches 8 on the inverter side, i.e. on the consumer bus bar 7.

The result is a permanent tipping of the inverter. The grid control of the rectifier will act so that the d-c is controlled to zero. Due to the slow variation of the reactive power delivery, a possible existing phase shifter cannot stabilize the three-phase a-c voltage; 100 percent load dumping occurs, the overvoltages now affecting also the converter valves of the rectifier. 3. Short-circuit in the three-phase a-c network on the inverter side.

In principle, the situation is the same as in case 2; the inverter tips. A d-c reduction to zero, however, is necessary only when a permanent failure has occurred in the fed three-phase a-c network.

4. Short-circuit on the d-c side.

By response of any desired protective device, the assigned current value zero is preset and thus the transmission turned off briefly.

With the above described faults it is logical to regulate the d-c to zero, so that the disturbance is remedied as quickly as possible (p.5, right column, second and third paragraphs of the above cited literature reference and separate printing "AEG-Mitt.", 56 (1966) 6, pp. 403–408, p. 406 left column, fourth paragraph). The converters then no longer derive reactive power from the three-phase a-c network. As a consequence thereof, there occurs a line-frequency overvoltage at the three-phase a-c terminals of the station and hence also at the converter valves.

The object of the invention is to avoid the line-frequency voltage elevation at the thyristor valves upon load dumping without absolutely necessary installation of additional rotating phase shifter power and without the above-mentioned reduction of the transformer short-circuit voltage. A suitable operational conduction of the controlling and regulating devices of the HVDC is intended to maintain the reactive power consumption of the converter station in cases of disturbance. The solution resides in a method of the kind described initially, in which according to the invention the d-c is first controlled back, in case of disturbance, to a value which is greater than zero and hence reactive power continues to be derived from a three-phase a-c network, and in which a rectifier is switched to inverter operation while accepting a higher transient excess current on the basis of the adjustment of the current regulator by slow i.e. progressive ignition angle variation. By this advantageous procedure, asymmetries and transient overvoltages are avoided, and the current conduction of the valve most stressed is shorter than with extremely rapid switching.

Figure 3:
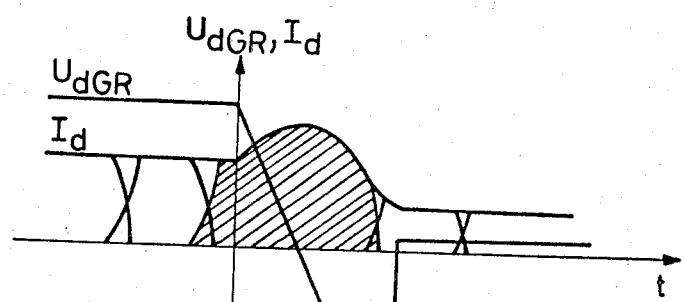
Figure 4:
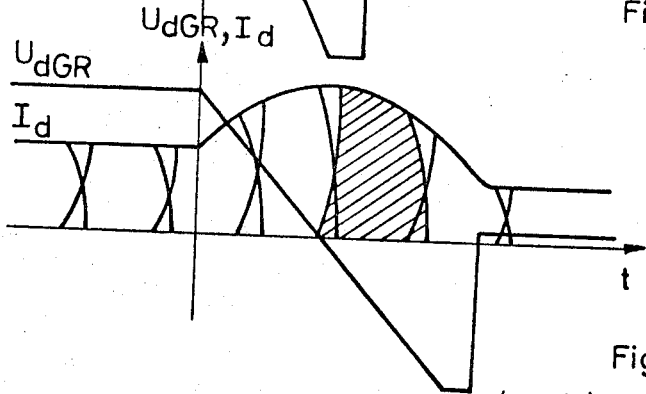

For better comprehension of the method, the current $I_d$ and voltage curves $U_{dGR}$ are indicated in FIGS. 3 and 4. These illustrations will now be explained.

According to the method of the invention, the converters are not blocked but switched in a progressive manner from rectifier to inverter operation. After a time interval they are immediately switched back to rectifier operation, so as not to let the current drop to zero, according to the invention, but to maintain it at a value greater than zero (FIG. 3). This measure alone, however, does not yet insure a favorable transient behavior of the three-phase a-c voltage, because immediately after the occurrence of the disturbance the rectifier is suddenly switched to inverter operation, to reduce the d-c after its short-circuit like rise. The ignition of the following valve, which was to occur at the moment of the switching, is then delayed by about 120 electrical degrees and the wattless interval in a phase of the three-phase a-c admission of the converter is prolonged accordingly (FIG.3). The resulting considerable voltage asymmetry causes the formation of high transient overvoltages.

Figure 6:
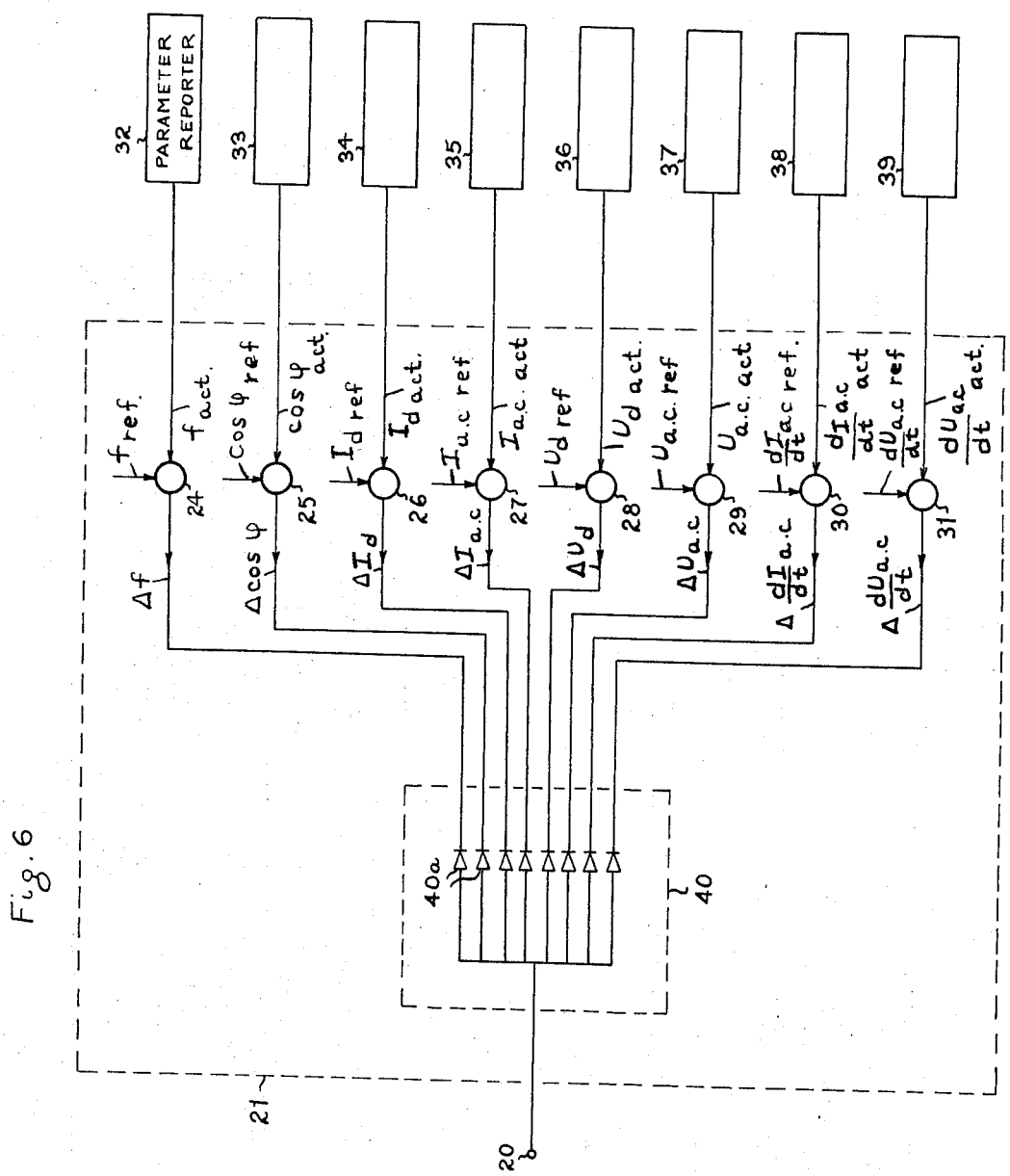

This unfavorable transient behavior of the three-phase a-c voltage is improved according to the further features of the method of the invention in that a special wiring of the current regulators to be described hereinafter with respect to the circuit illustrated in FIGS. 5 and 6 is provided which avoids an extremely rapid switching of the rectifier to inverter operation. Instead, the ignition times of the valves shift but slowly, i.e. progressively so that the current admission durations of the individual valves are only slightly lengthened and especially great asymmetries are avoided (FIG. 4). It can thereby be achieved that transient overvoltages do not occur. Due to the increased reactive power requirement at increased d-c, the three-phase a-c voltage is reduced by an appreciable amount and does not again increase to the nominal value until after the current has been reduced to the preset value after short overshooting.

The progressive ignition angle variation in case of disturbance naturally results, as FIG. 4 shows in comparison with FIG. 3, involing a sudden switchover from rectifier to inverter mode a higher overshooting of the d-c. Although thereby the current amplitude for the valves is increased, this need not involve a higher current stress for the most unfavorable valve, because the duration of the current conduction of a valve is shorter than at extremely rapid switching. This is evident from a comparison of the shaded current-time areas of the two most stressed valves.

For d-c transmissions over long distances with d-c overhead lines, there is always provided a so-called line protection, e.g. for protecting the d-c overhead line in case of ground faults. Such a protective device presets the desired current value zero for a certain case of disturbance; if an arc forms at any point of the line due to short-circuit, it can extinguish only if the d-c is controlled back to zero.

In a development of the method of the invention, the line-frequency voltage elevation is to be suppressed also in the case of response of the line protection of a HVDC system with d-c overhead line. This is achieved in a system with at least two rectifier (or inverter) stations or stations halves on the transmitting and receiving sides, respectively, in that during the response time of a line protection of one deflective station half, the d-c of the other and non-defective station half is increased by voltage lowering at the inverter, in such a way that the non-deflective station half absorbs from the three-phase a-c network above the same reactive power as both halves did together before occurrence of the disturbance. As an example there is used the circuit diagram in FIG. 2. In most cases of disturbance of the d-c line only one pole is affected. It suffices, therefore, to make only the station half on the side of the fault wattless, while the other remains in operation. During the short time of zero current presetting in the disturbed line half, the valves of the non-defective half may be overloaded. The current overload of the sound conductor branch is brought about by a variation of the control angle $\beta$ of the inverter in the instant of the release of the line protection. In order to maintain the reactive power absorption of the HVDC constant when a failure occurs, as assumed, the d-c of the remaining station half must be increased by a factor which is smaller than 2. The double value does not occur because the commutation reactive power increases not only with the amount of the d-c but also - and very sharply - with the ignition angle increase. It must be verified, of course, whether the remaining necessary current overload of the thyristor valves is still permissible. Determining for the rating is the permissible crest value of the passing current as a function of the excess current duration. It is not possible to state generally valid values because the load capacity depends on diverse parameters, as for example the starting temperature, the cooling conditions, the angles and forms of current flow. Assuming a certain excess current duration, which corresponds for instance to about the deionization time of the arc, one can read the permissible crest value of the current on the limit load curve. It may be said that it is perfectly possible so to overload the thyristors with a current flow duration according to the deionization time of the arc that constance of the reactive power absorption according to the invention is insured.

The use of the above-described method of maintaining a certain d-c in cases of disturbance is no problem as long as the inverter can properly commutate. In all cases of failure where a tipping of the inverter occurs, the two valves carrying current at that moment are overloaded as to current because of the long current conduction duration, even if the d-c does not exceed its nominal value. The d-c, therefore, must be controlled back to zero according to the permissible valve load.

In a further embodiment of the invention this control of the d-c back to zero occurs gradually, so that a phase shifter at the three-phase a-c bus bar of the rectifier can, during this time, vary its reactive power in such a way that the voltage at the three-phase a-c bus bar remains constant. It is thereby advantageously insured that the current load even of the valves of an inverter which no longer commutates remains limited to permissible values. To carry into effect this gradual control of the d-c back to zero, the current regulator of the rectifier must have a $di/dt$ circuit imposed on it which becomes effective only when the inverter can no longer commutate, i.e. when the voltage at the inverter is zero. After this preset zero current value the current can decrease only as slowly as the $di/dt$ imposed circuit permits. This imposed circuit should be selected so that the phase shifter is able to stabilize the voltage at the three-phase a-c bus bar by variation of the excitation, i.e. that the variation of the reactive load requirement of the rectifier caused by current reduction is compensated by a corresponding variation of the reactive power generation of the phase shifter. Variation of the excitation of the phase shifter is automatic if the latter is equipped with a voltage regulator which maintains the three-phase a-c voltage constant at a predetermined desired value.

In all, there result the following essential advantages in the use of the method according to the invention.

1. In the initially described cases of partial-load or load dumping, overload peaks are avoided. The method is applicable to a HVDC short-coupling and to d-c transmissions over long distances with d-c overhead line and protective device.

2. By the prevention of the zero modulation of the current in case of failure it can be achieved that the converter continues to absorb reactive power from the three-phase a-c network.

3. Because of the gradual switching of the rectifier to inverter operation, voltage asymmetries can hardly occur; transient overvoltages do not occur.

One suitable apparatus for carrying out the method in accordance with the invention is illustrated in more detail in FIG. 5 which depicts a control for one of the two converter stations, i.e. station 4 or 5. Each station consists of a full wave bridge circuit of two controllable valves, e.g. SCRs for each phase of the three-phase alternating current network 1, or 7 respectively. The control imputs to the valves are connected to corresponding control outputs of a ignition pulse generator 10 which shifts the ignition angles of the valves in dependence upon the output signal from a current regulating device 11 which can be a feedback type of amplifier receiving as input a regulating current quantity $\Delta I_d$ which represents the difference between the actual i.e. instantaneous value of the current $I_{d\,(act)}$ flowing in the high voltage d.c. line between the rectifier and inverter stations 4,5 as measured by a current transformer 13 connected into this line and a reference i.e. nominal value $I_{d(ref)}$. This current difference can be produced by means of a comparator device in the form of a conventional transistorized dual input operational amplifier 12 which receives at its two inputs respectively the current values $I_{d(act)}$ and $I_{d(ref)}$ and produces at its output the difference value $\Delta I_d$.

The reference value $I_{d(ref)}$ for the direct current is predetermined by a power control 14 which may be conventional feedback type amplifier which, in turn is regulated by the power difference $\Delta P_d$ produced at the output of a second comparator device 15 in the form of a conventional transistorized dual input operational amplifier 15 which receives at its two inputs respectively an analog of a reference i.e. nominal power value $P_{d(ref)}$ in the form of a voltage adjustable by hand from a potentiometer 23 and a voltage signal representative of the actual i.e. instantaneous value of the power $P_{d(act)}$ supplied from the output of a conventionally structured electronic multiplier 16 which is shown in figure 2 on page 340 of the book "Steuerungen and Regelungen elektrischer Antriebe", editioned 1959 by VDE-Verlag, Berlin and which receives at its inputs as the two quantities to be multiplied the actual value $I_{d(act)}$ of the direct current and the actual value $U_{d(act)}$ of the voltage of the direct current line interconnecting the converter stations 4, 5 by way of a conventional voltage divider unit 17.

So far as described, the control circuit arrangement of FIG. 5 for the rectifier and inverter stations 4, 5 corresponds generally to conventional technique in high voltage direct current systems. With its help, however, upon load dumping on the alternating current voltage side, only a change-over of the converter stations 4, 5 working in rectifier operation, to inverter operation is possible. For the voltage characteristic $U_{dCR}$ shown in FIG. 4, this circumstance would mean that the converter stations 4, 5 controlled from the positive potential range (rectifier operation) to the negative potential range (inverter operation) continues to operate in the negative potential range, owing to which the direct current $I_d$ would go back to zero. Such a direct current and direct voltage characteristic load dumping is avoided in the improved arangement according to FIG. 5, in that between the power control 14 and the current comparator 12 a release device 18 is interposed. One input terminal 19 to the release device 18 receives the output from the power control 14, and the second input terminal 20 thereto receives the output from a program control mechanism 21. If a control signal from the latter is applied on input terminal 20, the release device 18 functions to disconnect the first input from terminal 19 from the output terminal 22 and to connect through to this terminal the signal applied to input terminal 20. The release device 18 comprises two diodes, not shown, whose cathode terminals are forming the inputs 19,20 and whose anode terminals are connected in parallel to form the output 22. To the program control mechanism 21 are supplied all data concerning the state of the entire HVDC transmission system as actual values by measured-value reporters where they are compared with the corresponding reference i.e. nominal values stored there. If the difference between the respective actual and reference values exceeds certain values upon load dumping, the program control mechanism 21 intervenes in the control device of the converter stations 4,5 and brings about, by variation of the reference value $I_{d(ref)}$ of the direct current, the variation illustrated in FIG. 4 of the characteristic of the direct voltage $U_{dCR}$, in that first the converter station is progressively changed over from a rectifier to an inverter operating mode by progressively the firing angle of the SCR valves at the ignition pulse generator 13. This state is maintained for a predetermined time, and thereafter the converter station is controlled back to rectifier operation at the ignition pulse generator 10 by effecting the necessary change in the firing angle for the thyristor (SCR) valves in accordance with another variation of the reference value $I_{d(ref)}$ of the direct current, namely to a direct voltage value which is substantially lower than the voltage value before the load dumping occurred.

The reduced value of the direct voltage $U_{dGR}$ is rated so that despite the load dumping, the direct current $I_{dGR}$ has approximately the same value as before the load dumping.

Details of one suitable program control mechanism 21 are illustrated in FIG. 6. Here it will be seen that data concerning the state, i.e. various parameters, of the entire HVDC transmission are obtained respectively from a plurality of measured-value reporters 32 to 39 which produce outputs corresponding respectively to the actual (act) values of the parameters. These outputs are then compared with reference (ref) values of the various parameters by means of comparator devices 24 to 31 which are constituted by conventional dual input transistorized operational amplifiers, and two inputs to each amplifier being respectively the actual and reference values of the particular parameter concerned, and the outputs from the amplifiers being given in terms of $\Delta$ of each parameter.

Thus, more particularly, amplifier 24 compares the actual and reference values of frequency ($f$) and produces as an output $\Delta f$ corresponding to their difference; amplifier 25 compares actual and reference values of power factor $\phi$ of the 3-phase a.c. network and produces their difference as $\Delta\phi$; amplifier 26 compares actual and reference values of direct current ($I_d$) and produces their difference as $\Delta I_d$; amplifier 27 compares actual and reference values of alternating current ($I_{a.c}$) and produces their difference as $\Delta I_{a.c}$; amplifier 28 compares actual and reference values of direct voltage ($U_d$) and produces as their difference as $\Delta U_d$; amplifier 29 compares actual and reference values of alternating voltage ($U_{a.c}$) and produces as their difference $\Delta U_{a.c}$; amplifier 30 compares actual and reference values of the a.c. current gradient ($dI_{a.c}/dt$) and produces as their difference $\Delta (dI_{a.c}/dt)$; and amplifier 31 compares actual and reference values of the a.c. voltage gradient ($dU_{a.c}/dt$) and produces as their difference $\Delta (dU_{a.c}/dt)$. The difference ($\Delta$) outputs of the comparison amplifiers 24 to 31 are fed to the cathode sides of respective diodes 40a of a release device 40 which is similar to the release device 18 illustrated in FIG. 5. The anodes of the diodes 40a are all connected in parallel and these diodes function such that only the particular input thereto having the greatest magnitude is allowed to pass to the output terminal 20 whereas all other inputs are blocked. It will thus be apparent that since the inputs to the release device 40 are formed by the difference in magnitude of the reference and actual values of the various parameters of the HVDC system which are compared, the release device 40 provides at all times only a single output which is representative of the particular parameter which shows the greatest aberration i.e. the greatest departure from the reference (nominal) value adopted for a particular parameter of the system.

I claim:

1. In a high-voltage direct-current transmission system in which alternating-current power fed in from a polyphase voltage supply network is rectified by a converter of the thyristor valve type at a transmitting station and transmitted as direct current to a converter of the thyristor type located at a receiving station where it is then inverted into alternating-current power and supplied to a polyphase voltage network to which a consumer load is connected, the method for operating the system such as will diminish line-frequency overvoltage stresses on the thyristor valves particularly in the event of a disturbance of the type wherein partial or complete dumping of the consumer load occurs, which comprises the steps of progressively setting back the ignition angle of the converter at the transmitting station temporarily into the inverter range so as to progressively reduce the rectifier voltage, and thereafter re-setting the ignition angle of the converter at said transmission station into the rectifier range to prevent the rectifier current from dropping to zero during the disturbance, and the amplitude of the rectifier voltage following reset of said converter into the rectifier range being less than that which existed prior to the changeover of said converter into the inverter range, thereby to effect removal of reactive power from said polyphase supply network after the disturbance occurs.

2. A high-voltage direct-current transmission system operating in the manner defined by claim 1 wherein said transmitting and receiving stations each include two converters for rectification and inversion at their respective stations and which includes the further step during the response time of a line protection for a defective converter at the transmitting station - of increasing the direct current of the other and non-defective converter at the transmitting station by reducing the voltage of the converter at its corresponding receiving station whereby the non-deflective converter at the transmitting station absorbs from said polyphase supply network substantially the same amount of reactive power as did both of said converters prior to occurrence of the partial or complete dumping of the consumer load.

* * * * *